(12) United States Patent
Zenda et al.

(10) Patent No.: US 7,524,130 B2
(45) Date of Patent: Apr. 28, 2009

(54) MEMBER-JOINING DEVICE

(75) Inventors: Youichi Zenda, Osaka (JP); Katsuya Matsuzaki, Osaka (JP)

(73) Assignee: Kokuyo Co., Ltd., Osaka (JP)

( * ) Notice: Subject to any disclaimer, the term of this patent is extended or adjusted under 35 U.S.C. 154(b) by 83 days.

(21) Appl. No.: 10/529,957

(22) PCT Filed: May 19, 2004

(86) PCT No.: PCT/JP2004/007158

§ 371 (c)(1),
(2), (4) Date: Nov. 30, 2005

(87) PCT Pub. No.: WO2004/109129

PCT Pub. Date: Dec. 16, 2004

(65) Prior Publication Data

US 2006/0115324 A1     Jun. 1, 2006

(30) Foreign Application Priority Data

Jun. 4, 2003     (JP) .............................. 2003-160043

(51) Int. Cl.
*F16B 7/00*     (2006.01)
*F16B 12/36*    (2006.01)
*F16B 13/00*    (2006.01)

(52) U.S. Cl. ........................ 403/292; 403/377; 403/378; 403/379.1; 403/379.3

(58) Field of Classification Search ................. 403/292, 403/6, 268, 377, 378, 379.1–379.3
See application file for complete search history.

(56) References Cited

U.S. PATENT DOCUMENTS 4,557,467 A * 12/1985 Lin .............................. 256/59

5,078,534 A * 1/1992 White .......................... 403/292

(Continued)

FOREIGN PATENT DOCUMENTS

JP     50-118154 U     9/1975

(Continued)

OTHER PUBLICATIONS

International Search Report for PCT/JP2004/007158 mailed Oct. 12, 2004.

*Primary Examiner*—Daniel P Stodola
*Assistant Examiner*—Nahid Amiri
(74) *Attorney, Agent, or Firm*—Darby & Darby P.C.

(57) ABSTRACT

A member-joining device with which, when pipe members etc. are fixed to each other, a sufficient fastening force can be obtained even if the members have thin wall thickness. Member-joining device 8 has a first bridge member, a second bridge member and drawing means 6. First bridge member 81 joins first member 5 having a pair of opposing walls 53, 53 and a second member 31 having a pair of opposing walls 311, 311 and is spanned at a predetermined position of the first member between the opposing walls 53, 53. Second bridge member 82 is spanned at a predetermined position of second member 31 between the opposing walls 311, 311. Drawing means 6 draws first bridge member 81 and second bridge member 82 in the direction where both members are closer to each other. Accordingly, first member 5 and second member 31 are pressed and joined to each other by a drawing force of drawing means 6.

3 Claims, 19 Drawing Sheets

U.S. PATENT DOCUMENTS

| | | | | |
|---|---|---|---|---|
| 5,127,762 A | * | 7/1992 | Havlovitz | 403/298 |
| 5,465,929 A | * | 11/1995 | Dooley | 248/68.1 |
| 5,504,542 A | * | 4/1996 | Hino et al. | 351/206 |
| 5,769,460 A | * | 6/1998 | Imai | 285/18 |
| 5,906,451 A | * | 5/1999 | Goto | 403/268 |
| 6,474,747 B2 | * | 11/2002 | Beaulieu et al. | 30/296.1 |
| 6,676,326 B2 | * | 1/2004 | Wu | 403/329 |
| 2006/0204322 A1 | * | 9/2006 | Roiser | 403/109.5 |

FOREIGN PATENT DOCUMENTS

| | | |
|---|---|---|
| JP | 51-141219 U | 11/1976 |
| JP | 61-129913 U | 8/1986 |
| JP | 2-89928 U | 7/1990 |
| JP | 05-146316 A | 6/1993 |
| JP | 2004-147689 A | 5/2004 |
| JP | 2005-147239 A | 6/2005 |
| JP | 2005-163945 | 6/2005 |

* cited by examiner

MEMBER-JOINING DEVICE

CROSS REFERENCE TO PRIOR APPLICATION

This is a U.S. National Phase Application under 35 U.S.C. §371 of International Patent Application No. PCT/JP2004/007158, filed May 19, 2004, and claims the benefit of Japanese Patent Application No. 2003-160043, filed Jun. 4, 2003 both of which are incorporated by reference herein. The International Application was published in Japanese on Dec. 16, 2004 as WO 2004/109129 A1 under PCT Article 21(2).

TECHNICAL FIELD

The present invention relates to a member-joining device which is used to join each member having a pair of opposing walls of such as pipe members and channel members.

BACKGROUND ART

Traditionally, for instance, when each hollow member such as a pipe member is fastened by such as a screw, each separated outer wall of the hollow members overlapped with a different outer size is fastened as disclosed in Japanese Laid Open Patent Publication H5-146316.

Or when the outer sizes of each hollow member are the same, an inner member which is inserted into one of the hollow members from another hollow member is projected, and the outer wall of one of the hollow members and the inner member of the other hollow member are joined at an inserted position.

However, when each separated wall is fastened as disclosed in the former instance, it is different from the case when each coherent wall is fastened, and it cannot be fastened over strength in the direction of wall thickness because the fastening force acts to cave the wall in the thickness direction. Therefore when the thickness of the wall is thin, secured firming of each member may be difficult because sufficient fastening force cannot be obtained. Further there may be more or less a backlash in the joining status due to a difference between the screw hole and the screw and a process deviation of the screw hole.

On the other hand, in the latter instance, in addition to the same defect as more or less backlash in the joining status, according to this status, a defect may take place that a favorable joining status in which each end face of hollow member is joined face to face cannot be obtained (specifically there is an unexpected gap between the joining portion of each end face).

DISCLOSURE OF THE INVENTION

The present invention relates to providing a member-joining device which allows each end face of pipe members to be securely and coherently joined with sufficient fastening force and without backlash according to necessity when such as pipe members are fixed to each other even if its wall thickness is thin.

Specifically the member-joining device according to the present invention which is joining the first member having a pair of opposing walls and the second member having a pair of opposing walls comprises the first bridge member which is spanning or intervening between opposing walls at a predetermined position of the first member, the second bridge member which is spanning or intervening between opposing walls at a predetermined position of the second member, a drawing means draws the first bridge member and the second bridge member in the direction where both members are closer to each other; wherein the first member and the second member are pressed and joined by the drawing means and the drawing force.

Thus when the first member and the second member are drawn with the drawing means, the force acts along the face direction of opposing walls through the first bridge member and the second bridge member. Accordingly, the drawing force with the drawing means does not act to cave the wall in the direction of thickness and the members can be pressed and fixed to each other even if the first and second member are made of a thin material in comparison with the traditional joining means. Wherein, each opposing wall is not limited to be in parallel and for instance may include facing walls of such as a round pipe. Further the drawing force becomes a pressing force and therefore the factor which may cause a backlash can be eliminated because the drawing force acts along the face board direction of opposing walls and the members are pressed and joined to each other by such force.

Further, the member-joining device of the invention comprising a position determining means projected in the predetermined position of the first member, the first fixing portion having a screw hole installed in the predetermined position of the second member, the second fixing portion having a hole for insertion of screw installed in the projection portion of the position determining means and a drawing means which draws the first fixing portion and the second fixing portion by screwing together joins the first member and the second member; wherein a line connecting the first fixing portion and the second fixing is set by the drawing means in which a fractional force generated slides the first member and the second member along their contacting face, and a position determination action of the first member and the second member is carried out by the position determining means restricting the sliding movement.

Accordingly, the first member and the second member are closely contacted to each other by the drawing force, a fractional force in the sliding direction along the contact face between the first member and the second member is generated, and then the position determining means restricts the sliding movement at the predetermined position and the position determination action of the first member and the second member can be securely carried out. Thus, the first member and the second member can be securely coherently joined at the predetermined position. Further, the screw hole can be set as longer by installing the first fixing portion to the projection portion because the projection portion of the position determining means can be thicker. Therefore the drawing force of the drawing means according to the screwing of the screw can be more secured.

Further, the first member and the second member can have a displacement prevention means corresponding to the force at almost right angles to the sliding force, and the displacement prevention means can control the displacement action at almost right angles to the sliding force, and the position determination action of the first member and the second member can be securely carried out. Thus, the first member and the second member can be securely coherently joined at the predetermined position.

When each adjacent second member is joined through the first member, it is preferable in the first member that the first member comprises a pair of contact faces facing reversely to each other which are slightly beveled in the closing direction to each other in downward direction to increase reasonably the joining strength between the second members and to bend them at the connection; wherein the end face of the second member are pressed to the contact face to join the second member.

To be able to determine the position at right angles direction in the longitudinal direction in the connection of the first member and the second member, the second member is a pipe member; the first member comprises a pipe-like outer member having a coinciding cross section outline form with the second member and an inner member projecting away from each end face of the outer member; wherein each end face of the outer member is the contact face; and preferably the first member and the second member are joining by inserting the projecting portion to the end face of the second member. Accordingly, the inner member performs as the position determining means and the displacement preventing means and the contact face and the end face of both members can be joined securely without a gap.

As a specific way to perform securely connection and the position determination, if the line connecting the first bridge member and the second bridge member, or the first fixed portion and the second fixed portion is set not in right angles to the contact face in the side view and the divisional force is generated to slide the contact face and the end face by the drawing force, the outer face of the inner member and the inner face of the second member are closely contacted by the sliding force and the action for position determination between the first member and the second member can be performed.

The first member and the second member are installed as their connection direction almost coincides with their horizontal direction, the line connecting the first bridge member installed in the first member and the second bridge member installed in each second member positioning at its both sides is preferably set as like / \ shape in the side view in order to adequately carry out an operation for the drawing means.

The line with like / \ shape in the side view is preferably set in the lower half portion of up-and-down direction of the first member and the second member in order to effectively prevent opening the betweenness of the first member and the second member underside of the connection boundary region due to their own weight or uploaded weight.

BEST MODE FOR CARRYING OUT THE INVENTION

The inventors describe the implementation of the present invention referring to figures.

Figure 1:
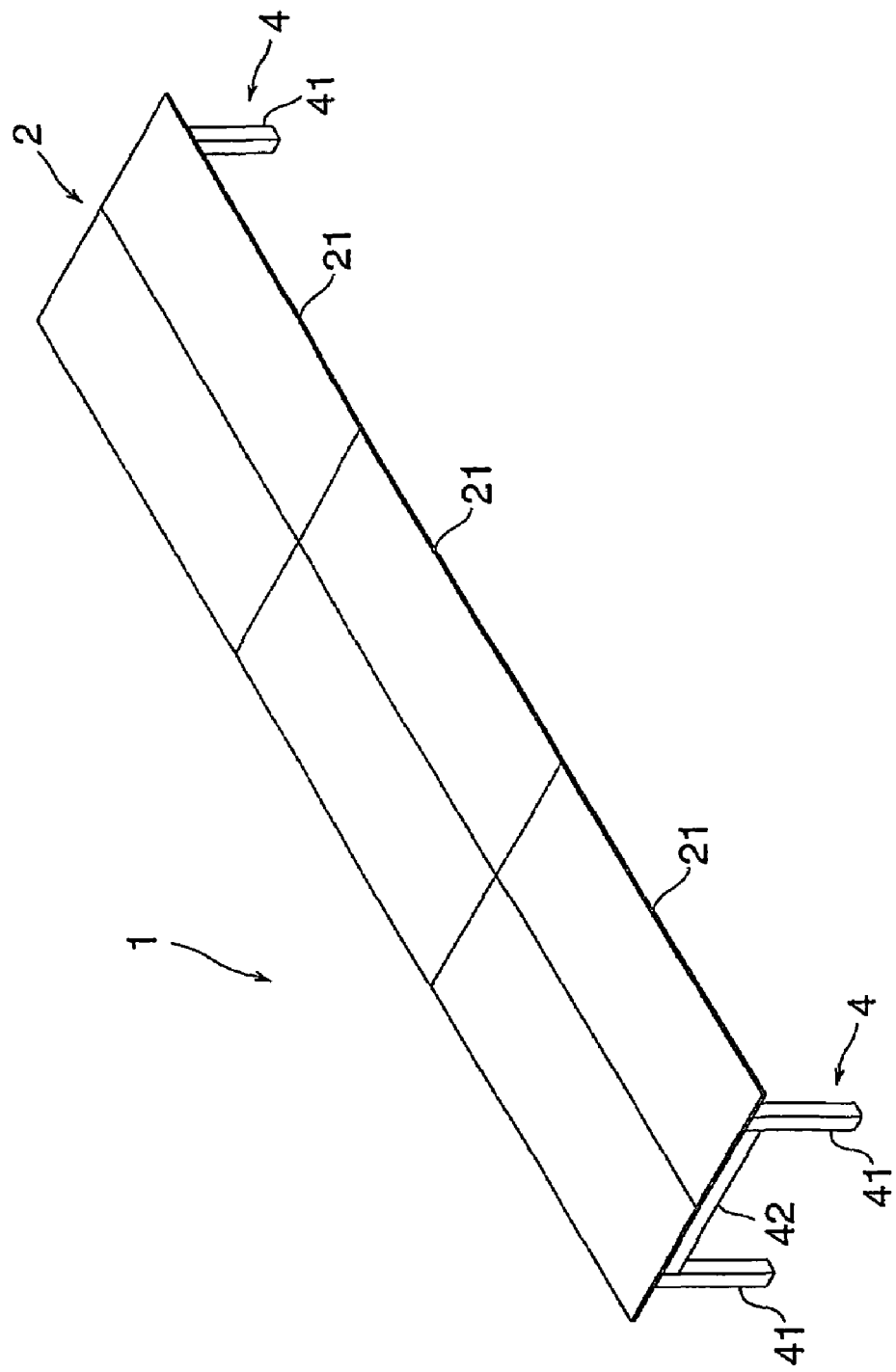
FIG. 1 is a total perspective view illustrating the table according to an implementation of one of the embodiments of the invention.

A member-joining device relating to an implementation of the invention is applied to tables illustrated in such as FIG. 1. Table 1 comprises top board 2, main frame 3 mainly supporting top board 2, and leg 4 supporting main frame 3 at its both ends.

Figure 2:
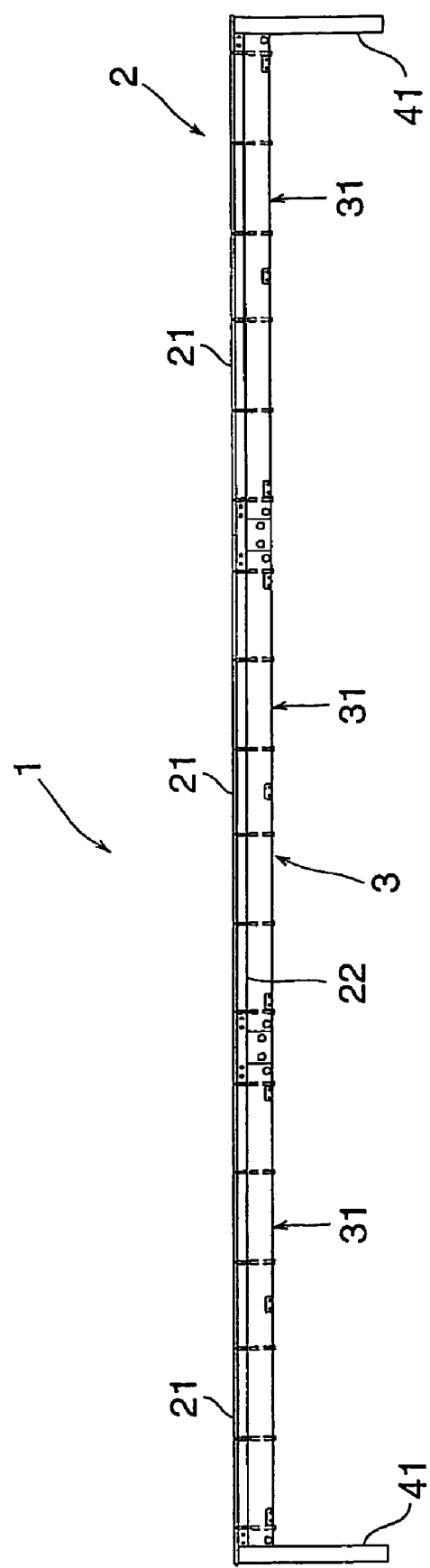
FIG. 2 is a total side view illustrating the table according to an implementation of one of the embodiments of the invention.
Figure 3:
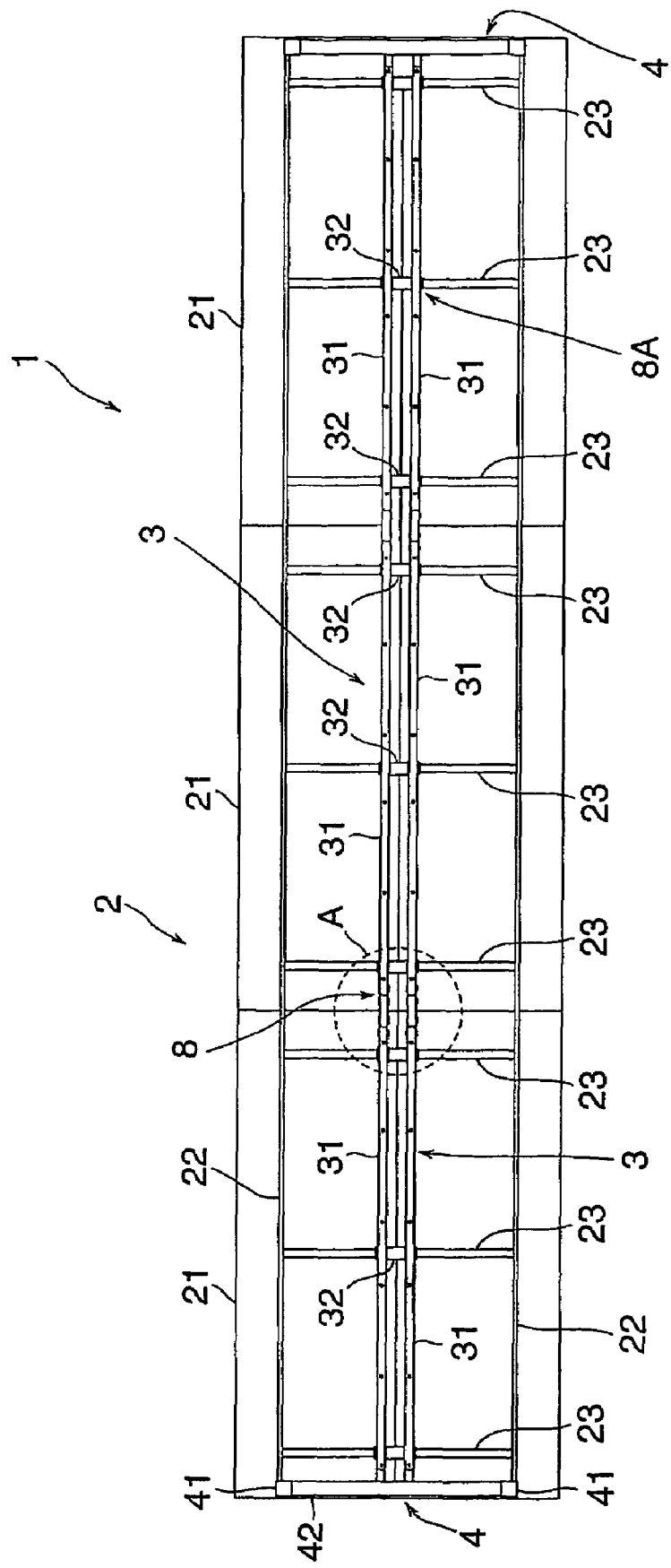
FIG. 3 is a total bottom view illustrating the table according to an implementation of one of the embodiments of the invention.

Referring to FIG. 1, FIG. 2 and FIG. 3, top board 2 is formed by attaching a pair of top board element 21 having a rectangular shape in the depth direction and setting plural elements board to board along the longitudinal direction of top board element 21. Side frame 22 and supporting frame 23 are installed to each top board element 21 to increase strength. Side frame 22 installed in the inside within a certain distance from longer side of board element 21 and along one of longer sides of board element 21 is a square shape pipe. Plural supporting frame 23 (3 frames according to the embodiment of the invention) are installed between each side frame 22 and is a square shape pipe which is extending at right angles to the longitudinal direction of each top board element 21 to join one pair of top board elements 21.

Main frame 3 extending along longitudinal direction of top board 2 comprises linearly connected plural main frame element 31 is a square pipe having an oblong structure. According to an embodiment of the invention, each one of main frames 3 is installed in boundary proximity of top board element 21 attaching each other and all in all, plural frames (two) are installed in parallel at the center of top board 2. Further, spacer frame 32 is installed intermittently in necessary position between main frames 3 to increase strength and set the distance in between. Main frame element 31 has almost the same length as the longitudinal length of top board element 21 and is installed correspondently under each top board element 21.

Leg 4 is installed at both ends of top board 2 and each leg 4 comprises a pair of leg elements 41 like a square pipe, horizontal member 42 like a square pipe connecting leg element 41 to each other at its top end and an adjuster (not illustrated in FIG.) installed under face of leg element 41. The end portion of main frame 3 is connected to the inside face of the center portion of horizontal leg 42 and leg 4 and main frame 3 form top board supporting structure 7 which can stand alone independently.

Further, the length of table 1 can be changed by increasing or decreasing the number of main frame element 31 and top board element 21.

Figure 4:
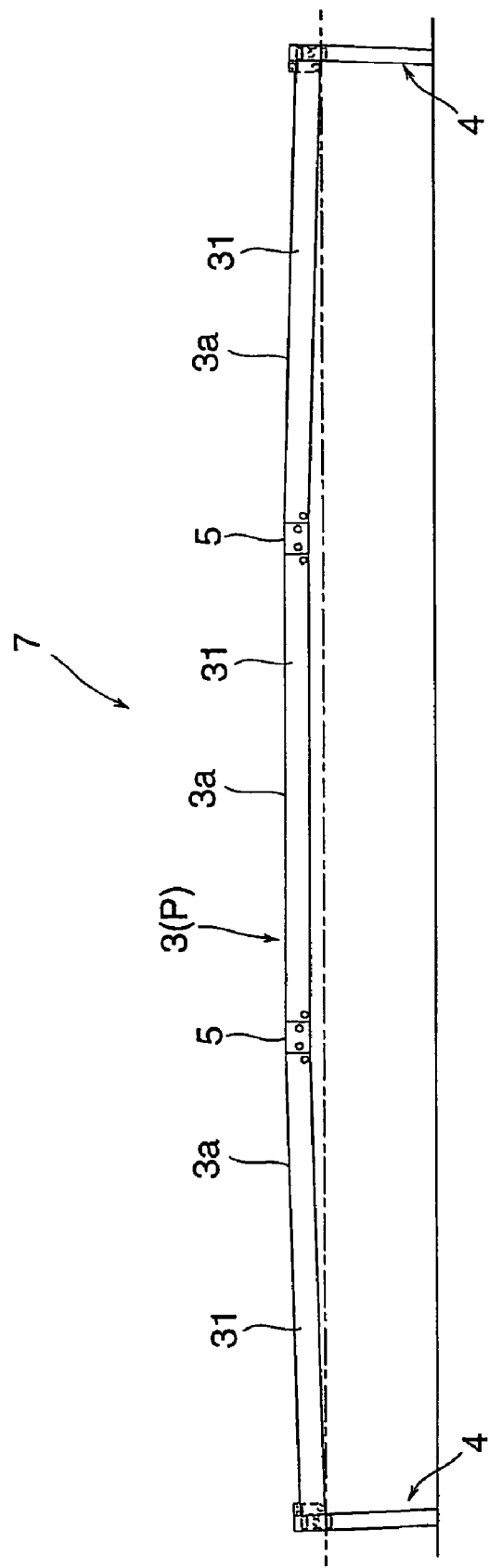
FIG. 4 is a total side view illustrating a supporting structure for the top board according to an implementation of one of the embodiments of the invention.

Further, referring to FIG. 4, under the condition where top board 2 is not loaded on supporting structure 7 of table 1, and specifically under the condition where none or almost none of weight of top board is added, it is composed of as evagination condition in which the center portion of top board supporting face 3a in main frame 3 is evaginating; and it is composed of as top board supporting face 3a is under one face condition or almost one face condition Q because of flexure of main frame 3 due to the weight under the weighted condition where top board 2 is loaded on top board supporting structure 7.

Figure 5:
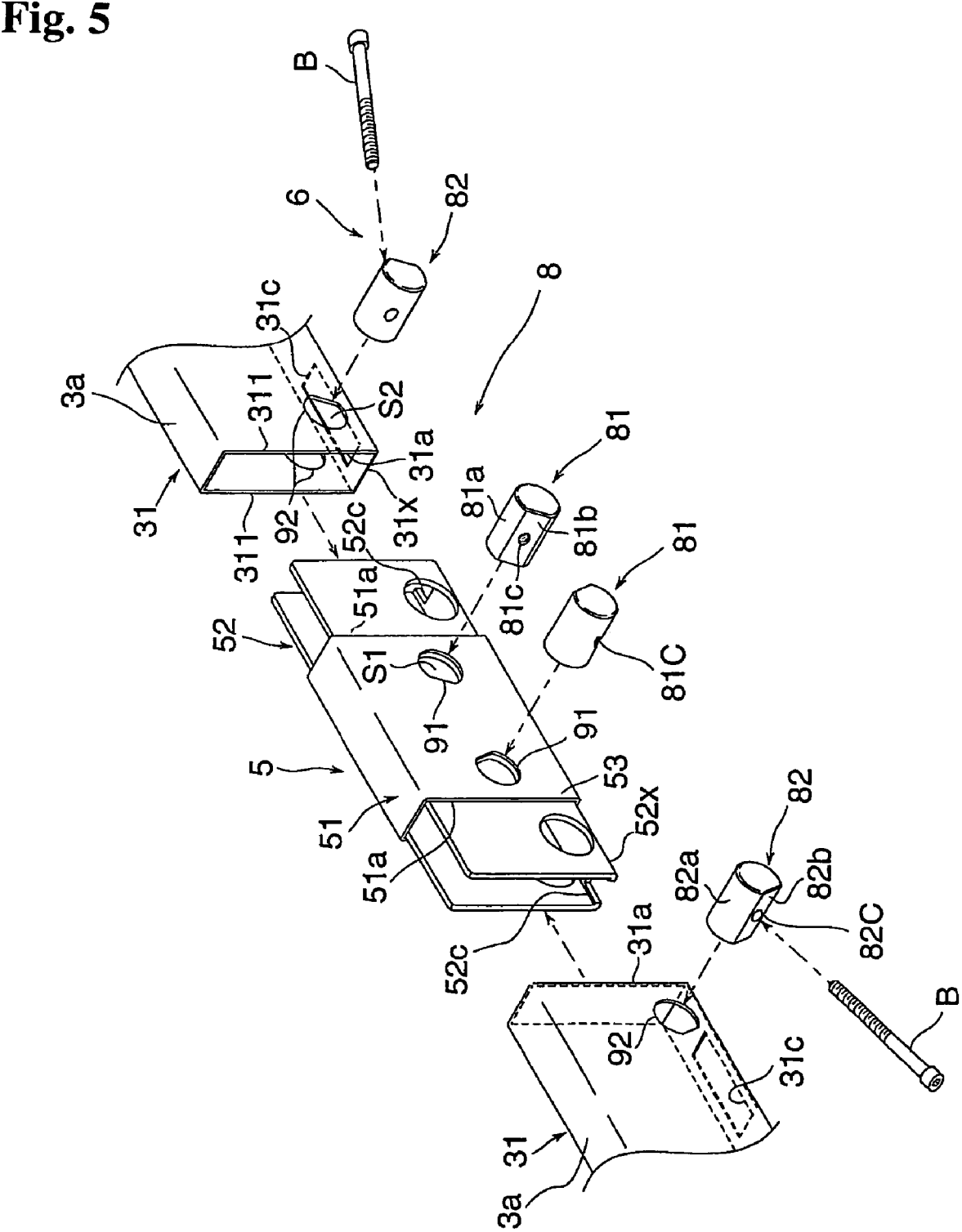
FIG. 5 is an exploded perspective view of a staple portion illustrating the connection portion according to an implementation of one of the embodiments of the invention.
Figure 6:
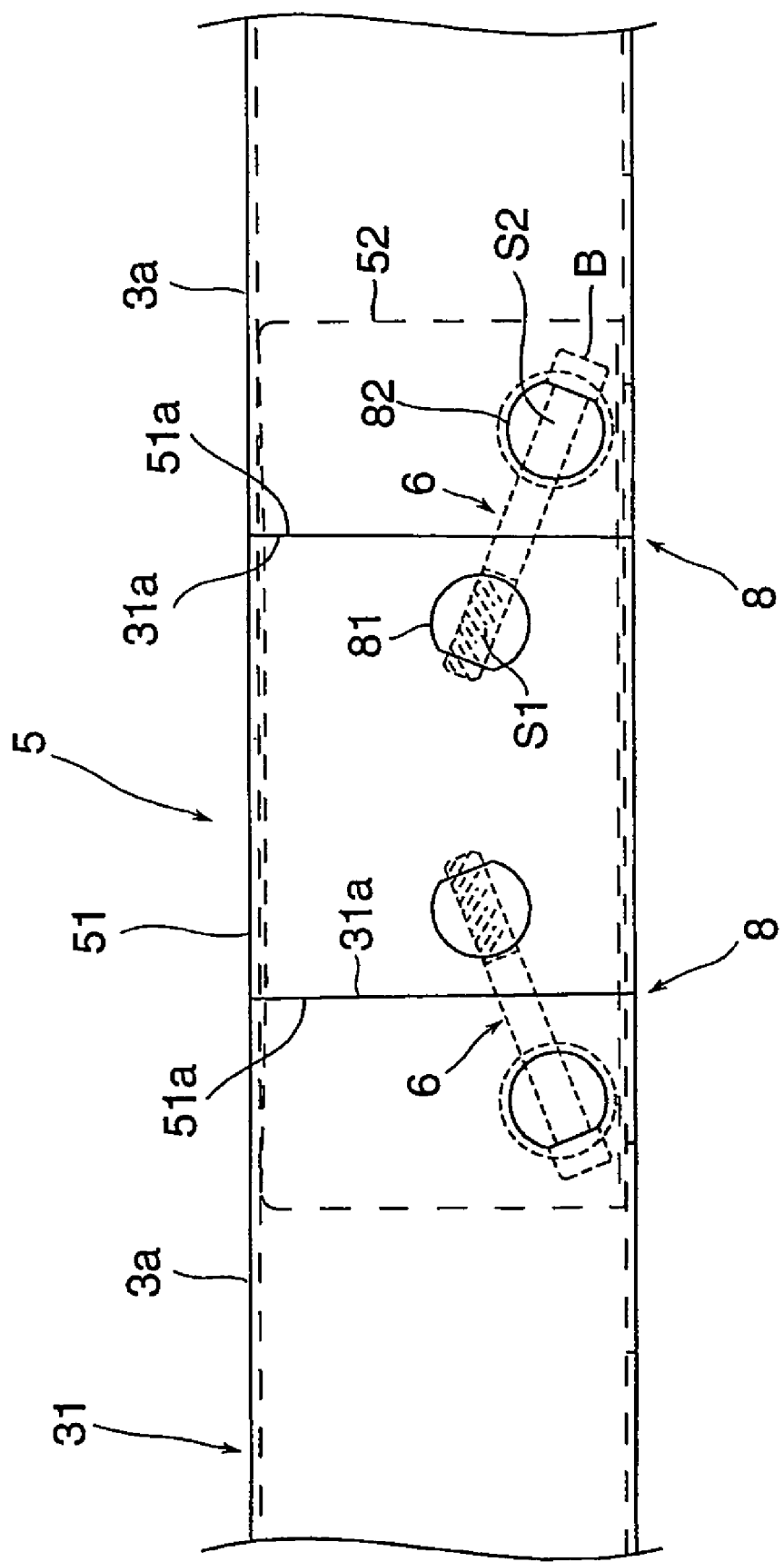
FIG. 6 is a side view of a staple portion illustrating the connection portion according to one of the embodiments of the embodiments of the invention.
Figure 7:
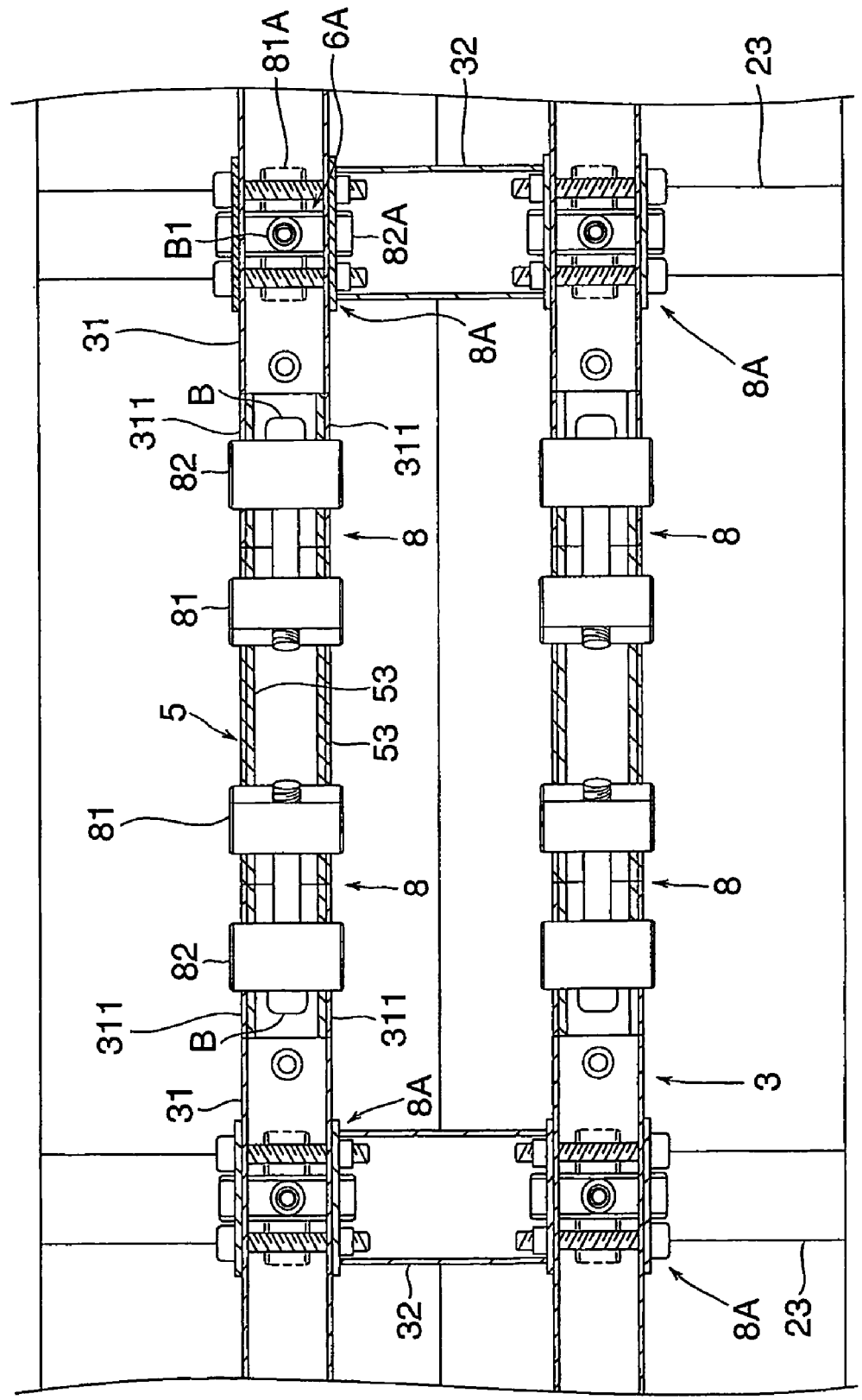
FIG. 7 is a cross section view illustrating the inside structure of A region in FIG. 3.

Specifically to set main frame under evaginating condition P connection portion between adjacent main frame elements 31 is bent, wherein main frame is forming a part of partial polygon. Specifically referring to FIG. 5, FIG. 6 and FIG. 7, adjacent main frame element 31 is connected to each other through connection member 5 in the connection portion.

Connection member 5 comprises pipe-like outer member 51 coinciding with the shape of the cross section outline of main frame element 31 and channel-like inner member inserted to the inner periphery of outer member 51 and connected by such as welding which is opening upward. Inner member 52 is projecting outward from each end face 51a of outer member 51, its thickness size is larger than the thickness size of outer member 51 to secure rigidity and strength in order to connect main frame element 31 each other. Outer member 51 plays a role as contact face 51a pressing end face 31a of main frame element 31 to each end face in which each contact face 51a facing reversely to each other which is slightly beveled in the closing direction to each other in downward direction. And the projected portion of inner member 52 is inserted into the end portion of main frame element 31 and is bent at the position where end face 31a of main frame element 31 is contacted to contact face 51a. Further end face 31a of main frame element 31 is set as perpendicular to its longitudinal direction.

Further the projected portion of inner member 52 is inserted to the end portion of main frame element 31 without a jounce at least in the width direction.

Table 1 is built into a structure as follows.

Firstly main frame 3 is built by connecting main frame element 31, horizontal member 42 of leg 4 is installed to each end portion of main frame 3, and independently stand alone top board supporting structure 7 is formed. Referring to FIG. 4, under such condition, the center portion of top board supporting face 3a in main frame 3 is evagination condition P evaginating above both end portions.

Top board 21 is loaded and fixed above top board supporting structure 7. Side frame 22 and supporting frame 23 are installed to top board element 21 at an appropriate timing. When top board element 21 is uploaded, a very little gap should be formed between adjacent top board elements 21. Main frame 3 is bent with total weight of top board element 21, specifically, loaded top board 2, and top board supporting face 3a of main frame 3 is under almost one face condition or one face condition Q, and accordingly top board face 2a becomes flat. Further, at that time the gap between top board elements 21 is disappeared and top board elements 21 closely contacts to each other.

According to an embodiment of the invention, member-joining device 8 is used to connect connection member 5 which is the first member and main frame element 31 which is the second member.

Member-joining device 8 comprises first bridge member 81 spanning opposing walls 53, 53 opposing in the depth direction at the predetermined position S1 of connection member 5, second bridge member 82 spanning opposing walls 311, 311 opposing in the depth direction at the predetermined position S2 of main frame element 31, and drawing means 6 drawing in the direction where first bridge member 81 and second bridge member 82 are close to each other; wherein drawing force based on drawing means 6 presses and connects contact face 51a of connection member 5 and end face of main frame element 31.

First bridge member 81 has a shape as a part of column is cut vertically with plane and is like solid-core block which forms column face portion 81a and plane portion 81b in periphery. Screw hole 81c is opening and penetrating to the center of plane portion 81b which is at right angles to its axis.

Second bridge member 82 has almost the same shape as first bridge member 81 and screw hole 82c instead of screw hole 81c.

Both ends of each bridge member 81, 82 are being supported with penetrating hole 91, 92 installed in each opposing wall 53, 311. Penetrating hole 91, 92 have a shape as bridge member 81, 82 can be inserted with almost no gap, and plane portion 81b, 82b of each bridge member 81, 82 are in right angles to drawing direction and support them reversely facing to each other.

Drawing means 6 can draw each bridge member 81, 82 by inserting screw B to screw hole 82c from plane portion 82b and screwing together screw B to screw hole 81c.

Further, according to an embodiment of the invention, a line in the side view connecting each predetermined position S1, S2 is set, specifically as screw forwarding direction is not in right angles to contact face 51a, to generate divisional force which slides contact face 51a and end face 31a with the drawing force. And referring to FIG. 5, outer periphery downward face 52x of inner member 52 and inner peripheral upward face 31x of main frame element 31 are closely contacted, and position determination of up-and-down direction in main frame element 31 and connection member 5 is carried out. The line above has a / \ like shape in the side view and is in the lower half portion of up-and-down direction in connection member 5 and main frame element 31.

Further, the direction of screw B coincides with the direction of the drawing above and its head portion is set as in the obliquely downward position, opening portion 31c is set as opening downward under face of end portion of main frame element 31, into which a tool such as a screw driver is inserted to tighten and loosen screw B, and runout 52c is installed in the outer peripheral bottom wall portion of inner member 52. Runout 52c is not always necessary if projection of inner member 52 is small.

In the tightened status, screw B inserted and screwed from opening portion 31c is buried completely in main frame element 31 and connection member 5, and screw B is invisible al least from the side direction or the top direction.

Further according to an embodiment of the invention, as well as above member-joining device 8A is used to join main frame element 3 and supporting frame 23 in the connection portion.

Figure 8:
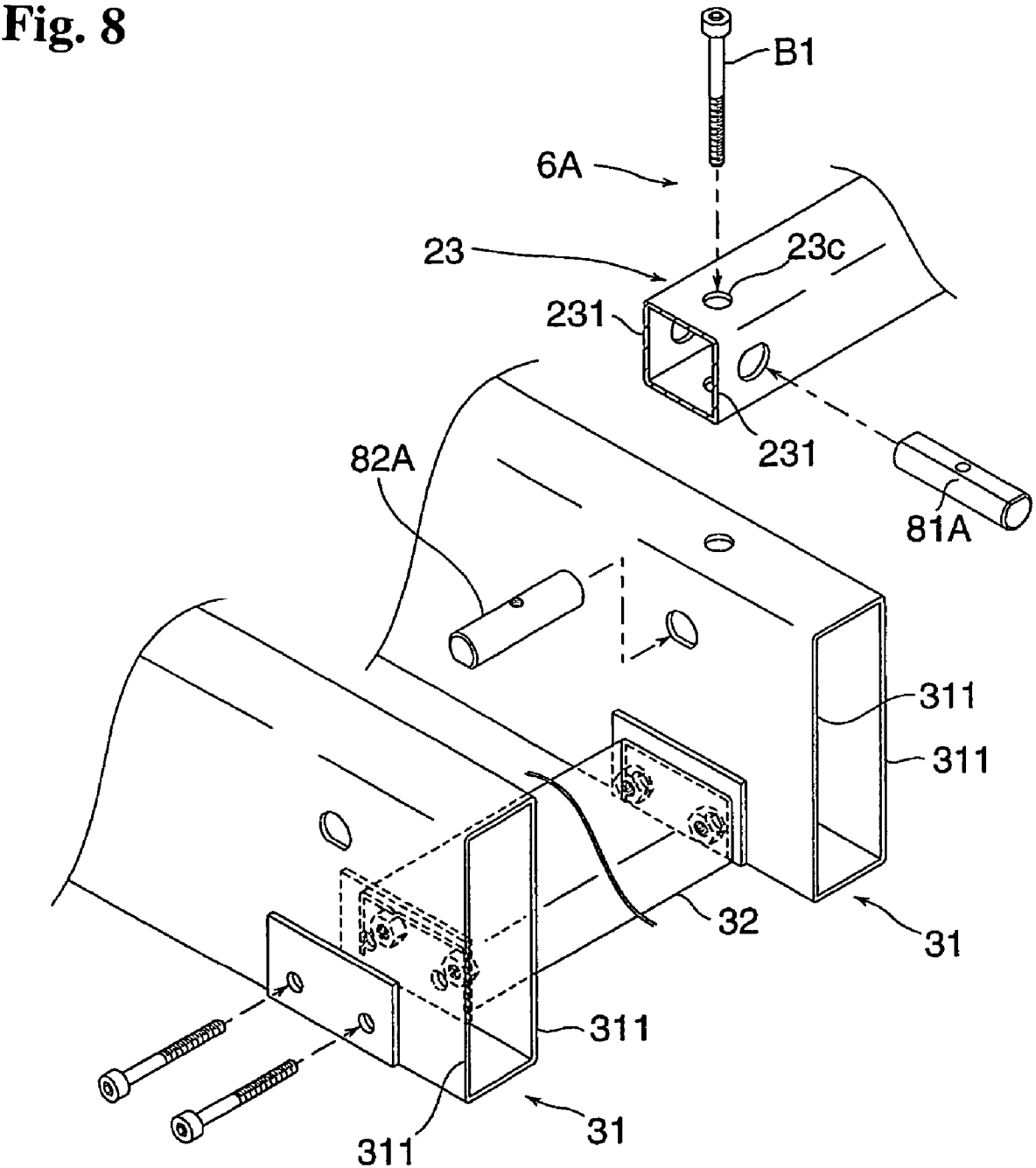
FIG. 8 is an exploded perspective view of a staple portion illustrating connection structure of the main frame and the supporting frame.

Referring to FIG. 8, member-joining device 8A as the first member, first bridge member 81A spanning between oppositely standing walls 231, 231 of supporting frame 23, and second bridge member 82A spanning between oppositely standing walls 311, 311 of main frame element 3 are drawn by drawing means 6A utilizing screw B1, and the upper face of main frame element 3 and the under face of supporting frame 23 are pressed and joined.

Regarding first bridge member 81A and second bridge member 82A, even though there is some difference in scale, they have the same form and an explanation is omitted.

Penetrating holes 91A, 92A supporting first bridge members 81A, 82A and drawing means 6A have the same form and an explanation is omitted.

Further, screw forwarding direction is perpendicular and has right angles to the connection face (upper face of main frame element 3 and under face of supporting frame 23) in member-joining device 8A.

Further, insertion hole 23c to which screw B1 is inserted is installed to supporting frame 23, and in connection status, screw B1 inserted from insertion hole 23c and screwed is completely buried in main frame element 3 and supporting frame 23 and invisible.

According to an embodiment of the invention, when drawing means 6 and 6A draw connection member 5 and main frame element 31, or supporting frame 23 and main frame element 3, the force works along the plane board direction of opposing walls 53, 311, 231 through first bridge members 81, 81A, and second bridge members 82, 82A. Accordingly, drawing force based on drawing means 6, 6A does not work to crave the wall in the thickness direction and therefore even if main frame element 31 is relatively thin material, the members can be pressed and fixed sufficiently to each other in comparison with traditional connection means.

Further the number of parts can be reduced because one of bridge members 81, 81A, 82, 82A plays a role as a nut block.

Further, the present invention is not limited to the embodiments of the invention.

For instance, one common bridge member to two main frames can span. If such common bridge member to plural members is used, simplification of structure farther can be carried out. Further the bridge member is fixed to main frame and the spacer frame above can be eliminated. Further both end of the bridge member can be fixed to opposing wall by such as welding and the bridge member can be set between opposing walls.

Of course various alternation of such as shape of bridge member can be carried out, and any structure can be accepted for the first member and the second member if it has at least opposing walls in such as channel-like members.

According to the invention, if one or none of the first member and the second member has an opposing wall or even when the opposing wall is not utilized nevertheless they have an opposing wall, an effective member-joining structure can be provided.

Figure 9:
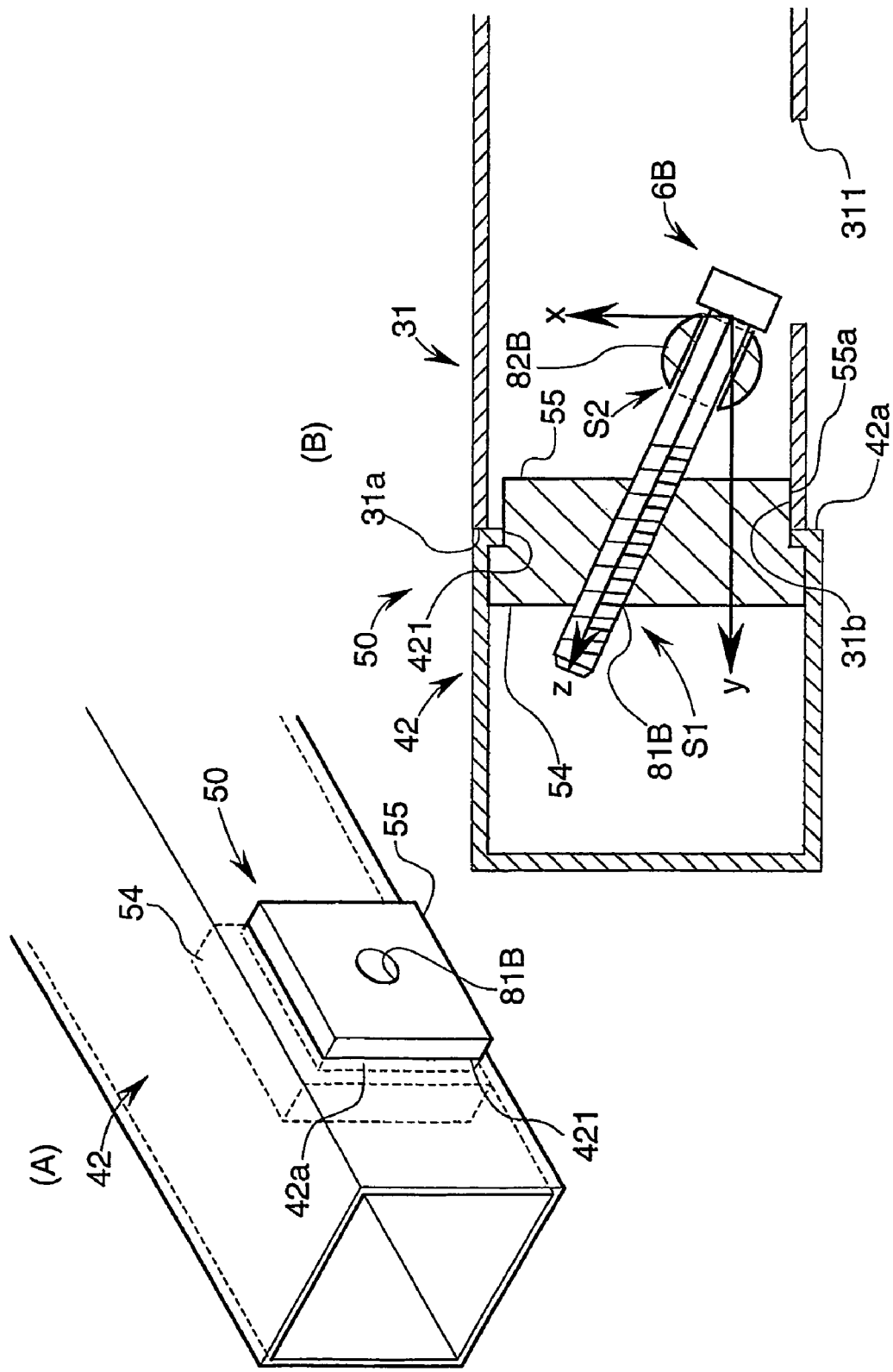
FIG. 9 is a perspective view of a staple portion (A) and a cross section view (B) illustrating the connection portion according to an implementation of the other embodiment of the invention.

For instance, referring to FIG. 9, according to an Implementation of other embodiment of the invention, first horizontal member 42 as the first member and second horizontal member 31 as the second member are connected through the connection member 50 as member-joining device 8B.

Referring to FIG. 9(A) and FIG. 9(B), connection member 50 is installed to opening portion 421 in the predetermined position of first horizontal member 42, and comprises internal backing portion 54 in first horizontal member 42, and projection portion 55 working as position determining means and displacement prevention means is projected to outside by closely penetrating opening portion 421 of first horizontal member 42 from backing portion 54. Outer size in the width direction of projection portion 55 is set approximately as it can be closely inserted corresponding to inner size in the width direction of second horizontal member 31 connected to first horizontal member 42, and inner size of up-and-down direction is set approximately as it can be loosely inserted to corresponding to inner size of up-and-down direction of second horizontal member 31 connected to first horizontal member 42. First fixing portion 81B having threaded screw hole is formed at the obliquely upward position in the reverse projection direction from predetermined S1 of connection member 50, specifically the projection end face of the projection portion and second fixing portion 82B is formed by spanning the bridge member having screw insertion hole as well as the embodiment above between the oppositely standing walls of second horizontal member 31 at the position corresponding to first fixing portion 81B where is lower position than predetermined position S2 of second horizontal member 31, specifically the fixing portion of first horizontal member 42.

Then both horizontal members 4231 are connected to each other by drawing force z based on drawing means 6B; wherein bolt-like drawing means 6B draws first fixing portion 81B and second fixing portion 82B closer to each other; and wherein the standing wall of first horizontal member 42 is contact face 42a of the invention and end face 31a of second horizontal member 31 is contact face 31a of the invention.

In such case, according to an embodiment of the invention, a setting of a line connecting S1, S2 in the side view based on position relationship between first fixing portion 81B and second fixing portion 82B, specifically screw forwarding direction, is carried out not to be at right angles to contact face 42a. Accordingly, not only drawing force z works as force y pressing end face 31a of second horizontal member 31 to the standing wall of first horizontal member 42, but also divisional force x to slide second horizontal member 31 against first horizontal member 42 along contact face 42a and contact face 31a is generated. And outer periphery downward face 55a of projection portion 55 works as a position determining means to control sliding over the range with slide divisional force x by contacting to inner upward face 31b of second horizontal member 31, and also it can work as a displacement prevention means to control displacement in the width direction when the standing face of projection portion 55 in the width direction is inserted to the inner wall of the standing wall of second horizontal member 31. Further the drawing force of drawing means 6B with screwing the screw can be more secured because the threaded screw hole can be set as longer by installing threaded screw-like first fixing portion 81B to connection member 50 comprising projection portion 55 which can be easily set as thicker.

Further the direction of screw B is coinciding with the drawing direction, the head portion is set in obliquely downward position, and opening portion 311 opening downward is installed under the face of second horizontal member 31 for insertion of a tool such as a screw driver for tightening and loosening screw B.

In the connected status, screw B which is inserted from opening portion 311 and screwed is buried completely in first horizontal member 42 and second horizontal member 31, and Screw B is invisible at least from side or top direction.

The embodiment above can be implemented where opening portion 421 and connection member 50 can be installed.

Figure 10:
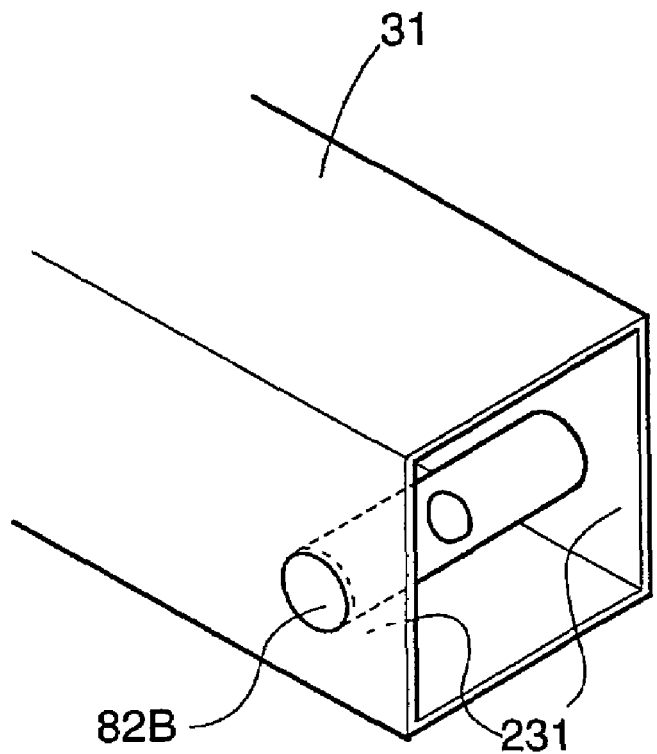
FIG. 10 is a perspective view of a staple portion according to an implementation of the other embodiment of the invention.
Figure 11:
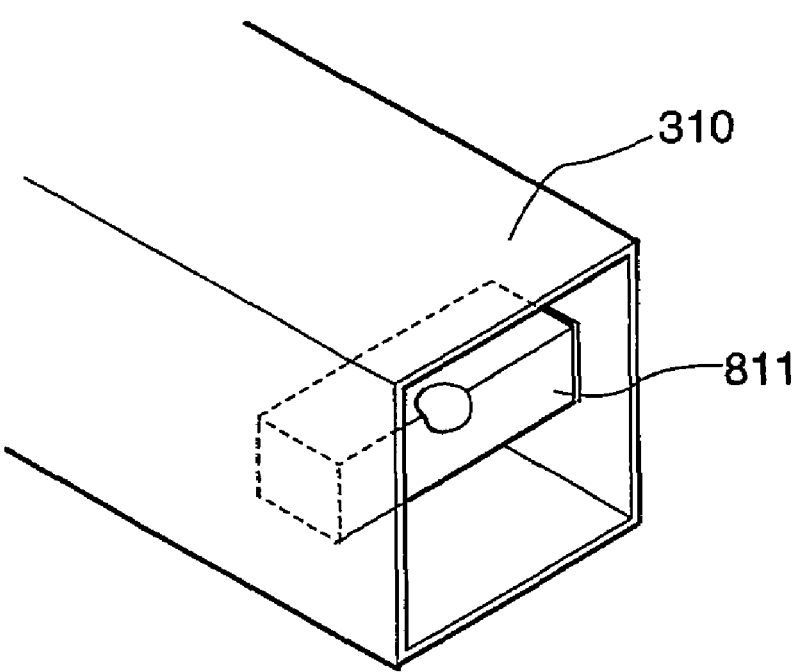
FIG. 11 is a perspective view of a staple portion according to an implementation of the alternated embodiment of the invention.

Further referring to a perspective view illustrated in FIG. 10, the form of second fixing portion 82B installed in second member 31 can be as column-like bridge member 82B is penetrated by forming circular hole between oppositely standing walls 231, 231. Further referring to FIG. 11, square column-like spanning member 811 can be installed as the second fixing portion. Referring to the same figure, bridge member 811 is an embodiment in which it is fixed between oppositely standing walls of second member 310 by welding and is not penetrating the oppositely standing walls.

Figure 12:
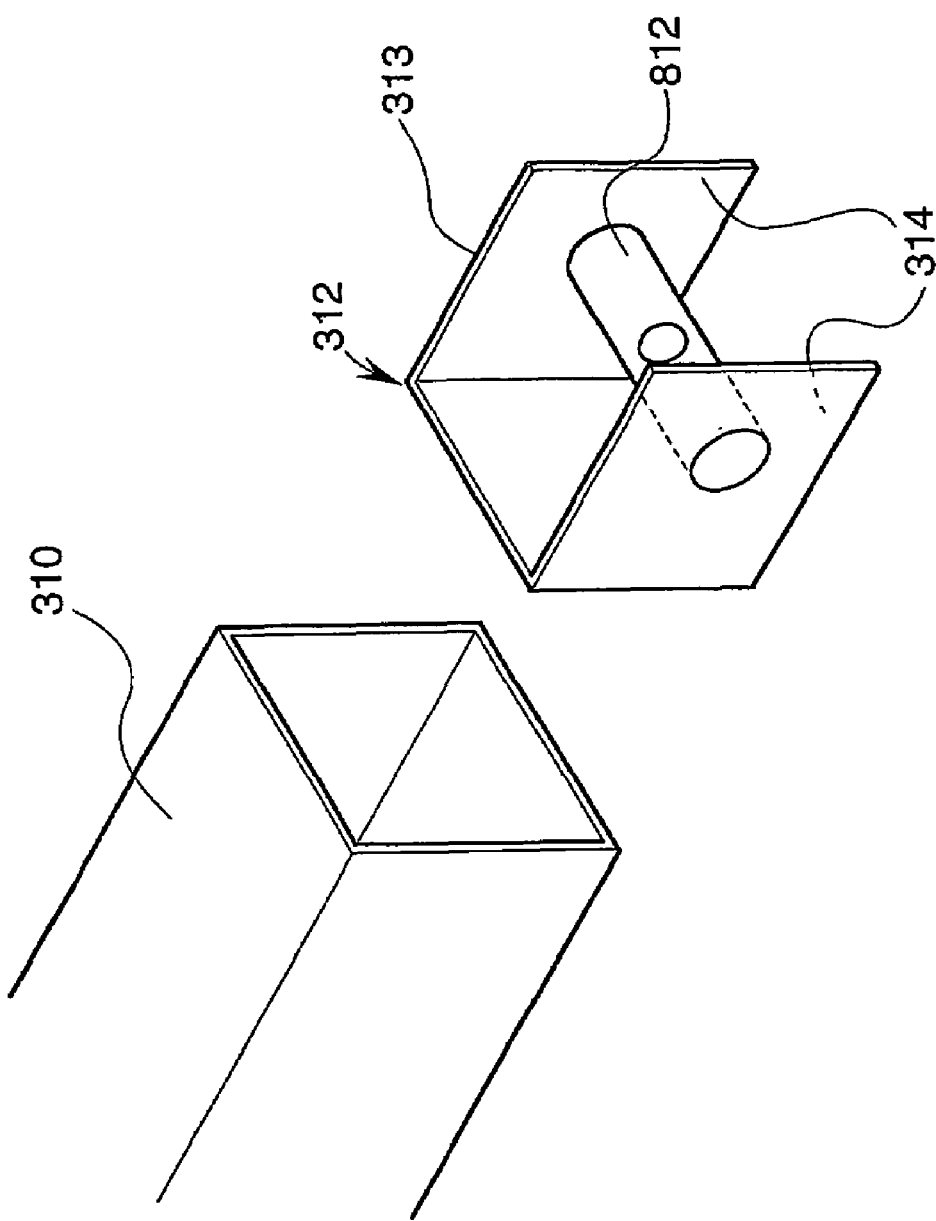
FIG. 12 is a perspective view of a staple portion illustrating the alternated embodiment.

Further, referring to FIG. 12, a bridge member spans between oppositely standing walls 314, 314 which plane board 313 bent as ] like-shape is comprising, and plane board 313 is inserted into square pipe-like second member 310 as the second member and first fixing member 812 can be installed to square pipe-like member 310 adhered to the inner wall by such as welding.

Accordingly, the form can be selected and applied in accordance with adhesive member and position, and then the application area of the embodiment of the invention can be farther expanded.

Figure 13:
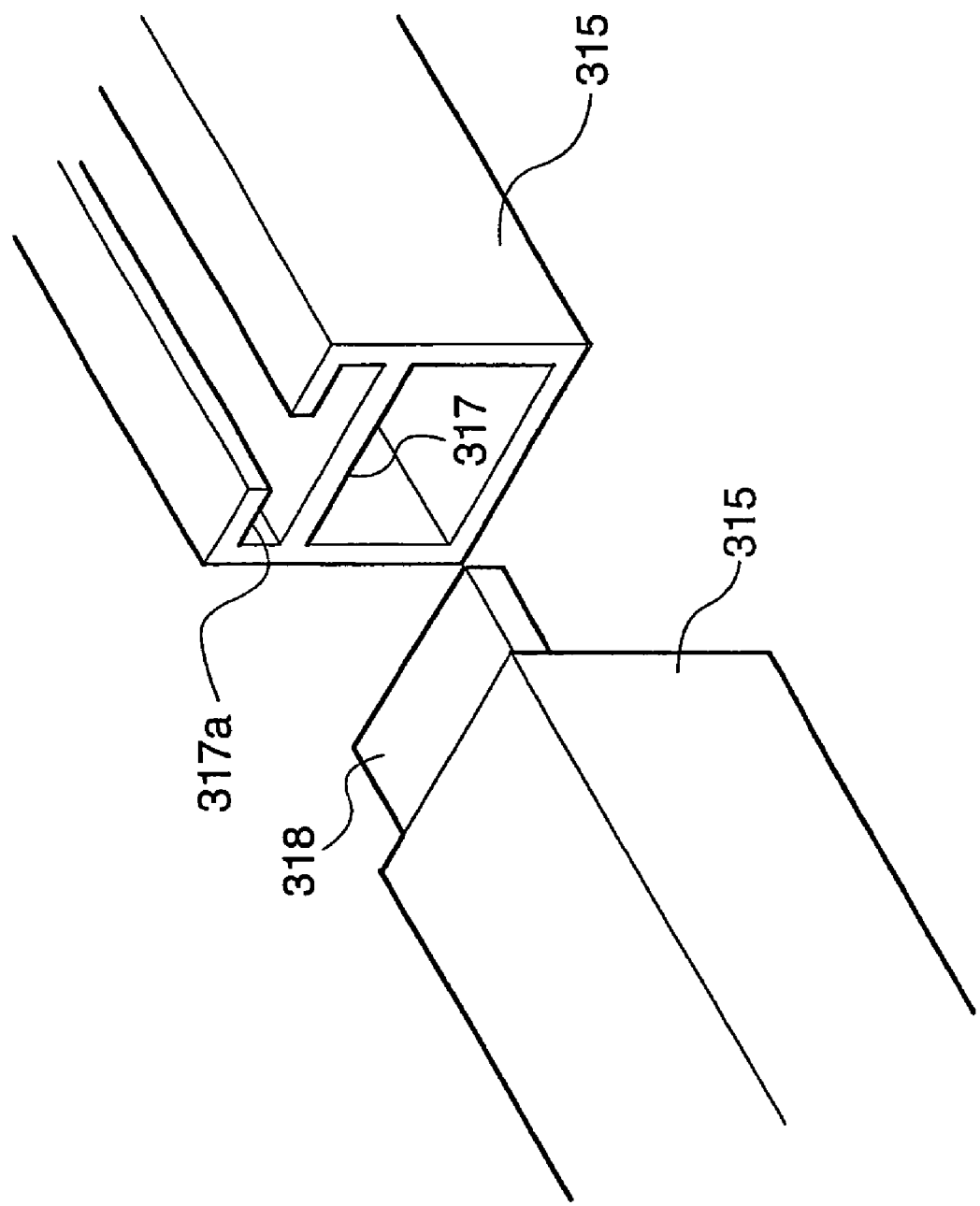
FIG. 13 is a perspective view of a staple portion according to an implementation of other alternated embodiment of the invention.

Further, referring to FIG. 13, when two square pipe-like members 315, 316 are connected, projection portion 318 can be functionalized as a displacement prevention means of the invention by utilizing space 317a in upper portion of such as partition member 317 at the cross section of first member 315, forming cross section-like projection portion 318 corresponding to space 317a to second member 316, and inserting into space 317a. Further if such connection form is used as the position determining means and the displacement prevention means according to an embodiment of the invention, both members can be more adequately joined. Accordingly, the member-joining device according to an embodiment of the invention can be applied more adequately and more widely if it is used together with the member connecting means.

Figure 14:
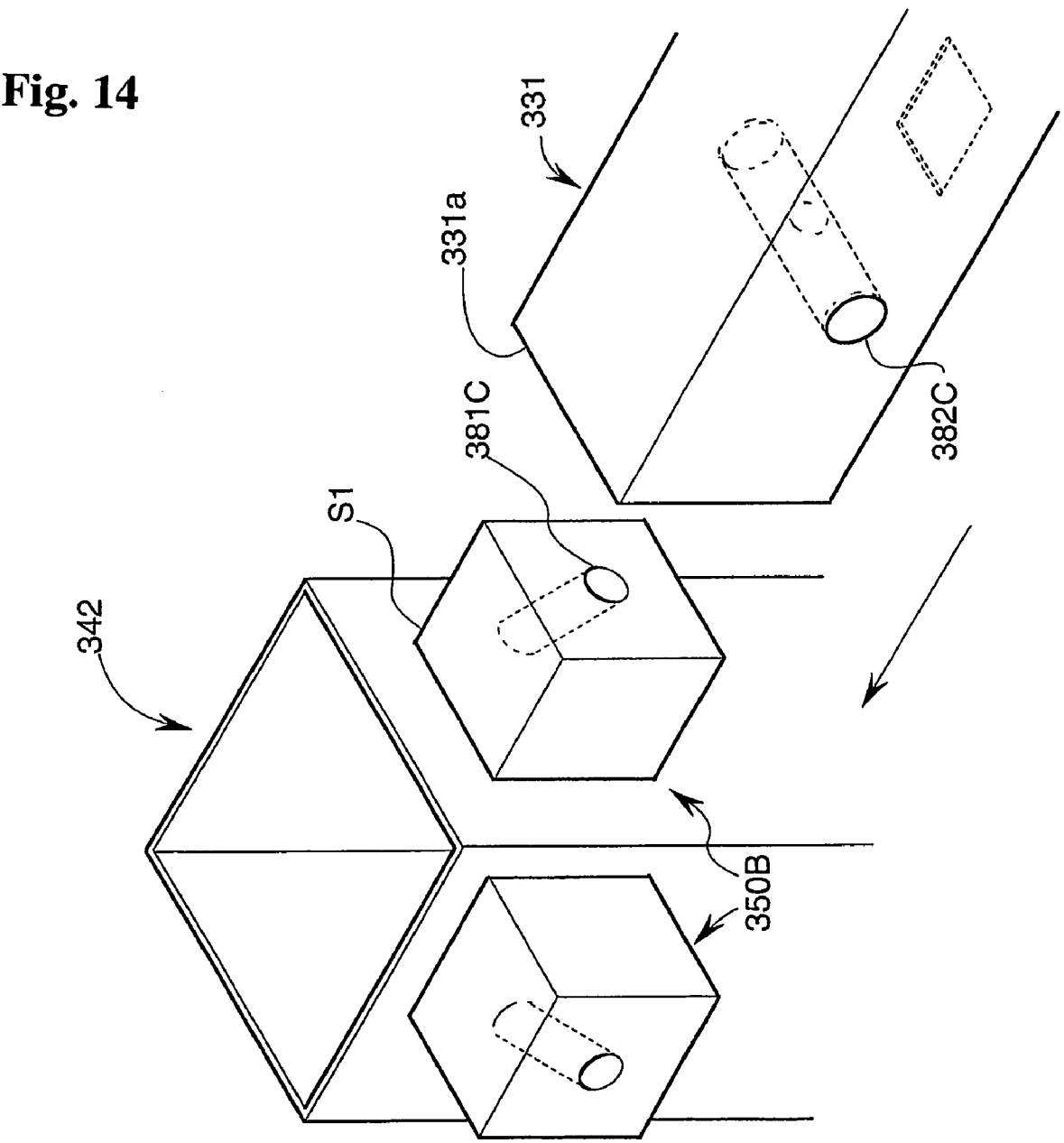
FIG. 14 is a perspective view of a staple portion according to an implementation of other alternated embodiment of the invention.

Further, referring to FIG. 14, according to an alternative embodiment of the embodiment of the invention, horizontal member 331 as the second member can be connected by externally installing rectangular parallelepiped connection member 350B to predetermined position S1 of column support 342 as the first member using such as welding. Connection member 50B of which main body, as is, can be inserted end portion 331a of horizontal member 331 as well as projection portion 55 of connection member 50 works as a position determining means and a displacement prevention means. Connection member 350B comprises threaded screw hole-like fixing portion 381C arranged in beveled direction which is installed in predetermined position S1 and shows the same action and effect as connection device 50; wherein first fixing portion 381C and second fixing portion 382C installed to horizontal member 31 as well as connection member 50 above are connected by drawing with drawing means which is not illustrated in figure.

Accordingly, in addition to the action and the effect of connection device 50, for instance, when space for insertion of such as backlash member in column support 342 is insufficient, an insertion of other member is impossible and horizontal member 331 is connected to column support 342 from plural directions illustrated in the same figure, it can be especially adequately applied.

Figure 15:
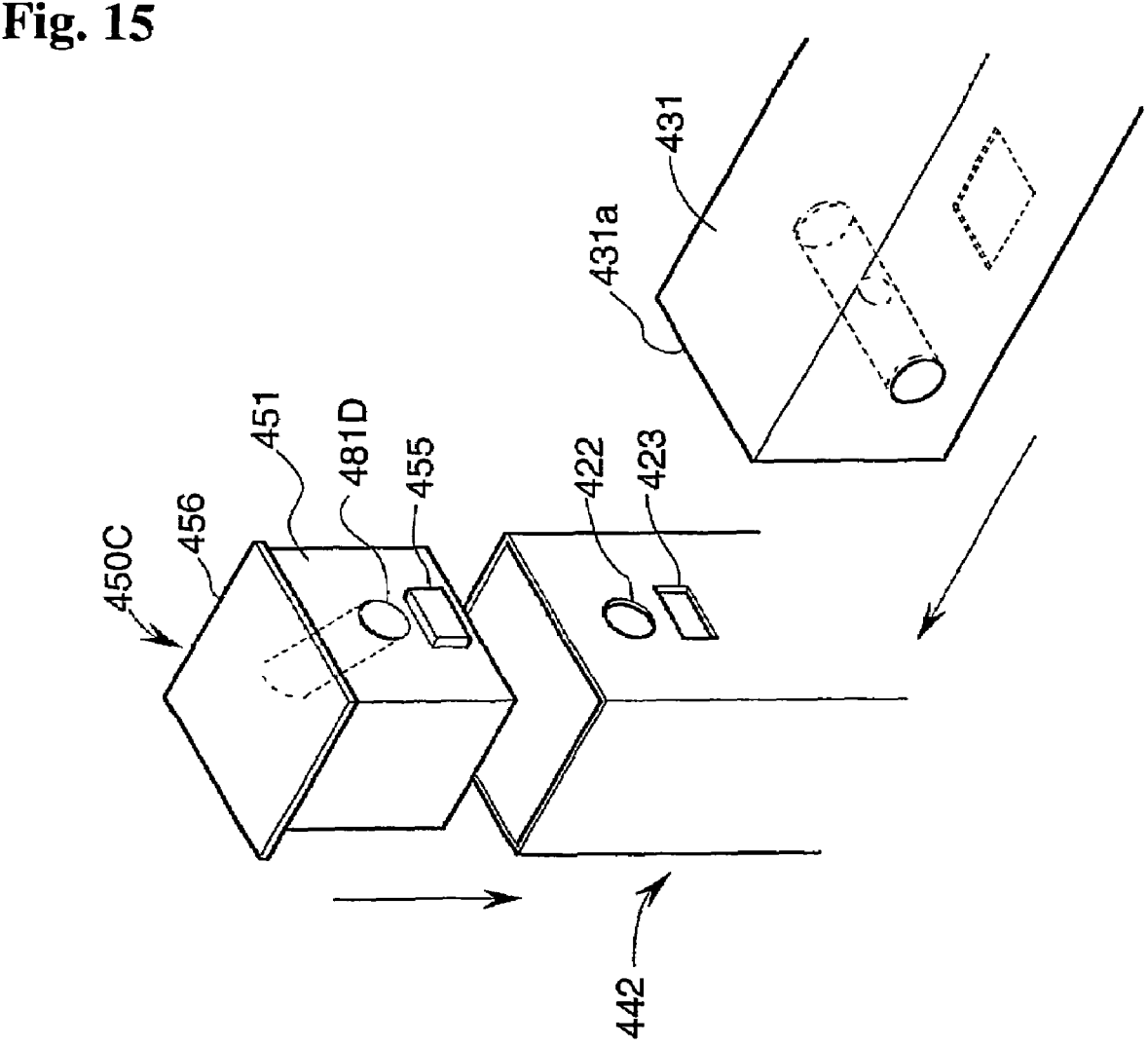
FIG. 15 is a perspective view of a staple portion according to an implementation of other alternated embodiment of the invention.

Further referring to FIG. 15, according to other implementation of the embodiment of the invention, horizontal member 431 is connected in which a cap installed to the top end portion of column support 442 as the first element is used as connection element 450C. Connection element 450C comprises threaded screw hole-like first fixing portion 481D arranged in beveled direction projection portion 455 projected from the main body 451 and upper face portion 456 which is flat plate having the same form as the end face of upper end portion of column support 442 in predetermined position of main body 451. When connection member 450c is installed to column support 442, upper face portion 456 of connection member 450C is installed to the end portion of column support 442 while incorporating the main body, and then after connection member 450C is moved toward first opening portion 423 installed in predetermined position S1 of column support 442 to project projection portion 455 to outside from second opening portion 423 installed in column support 442. On the other hand as well as each embodiment above, a bridge member working as the second fixing portion is spanned between oppositely standing walls of horizontal member 431 as the second member being connected to column support 442. Drawing means such as screw inserted obliquely from the horizontal member, which is penetrating the bridge member and column support 442 is screwed to first fixing portion 481D and tightened to draw the gap between column support 442 and horizontal member 431; wherein end face 431a of horizontal member 431 can be pressed to external walls to adhere and fix.

And although also in this case the upward slide force in right angles to the drawing direction is generated as a divisional force to column support 442 in horizontal member 431, the upper face of the bottom wall of horizontal member 431 is stopped at the face of projection 455 facing downward and projection 455 can be effectively functionalized as position determining means of the invention.

Figure 16:
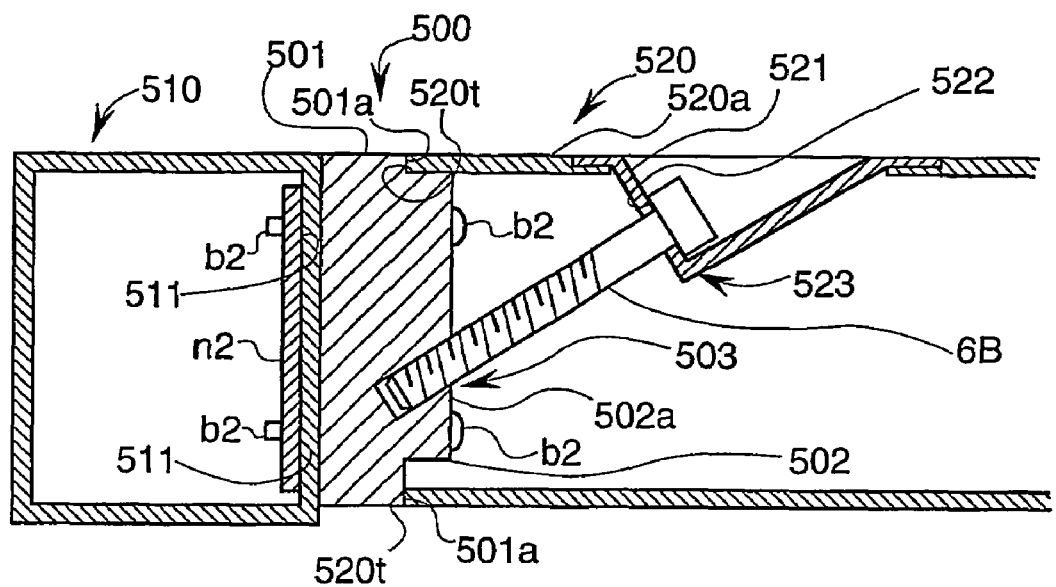
FIG. 16 is a cross section view of a staple portion according to an implementation of the other alternated embodiment of the invention.

Further referring to FIG. 16, according to other implementation of the embodiment of the invention, first horizontal member 510 as the first member and second horizontal member 520 is connected through connection member 500.

Connection member 500 is externally installed to first horizontal member 510 by installing bolt b2 and nut n2 to the position of screw hole 511 installed in the predetermined position of first horizontal member 510, and comprises intervening portion 510 being exposed to outside on the installation of second horizontal member 520 and projection portion 502 working as a position determining means and a displacement preventing means according to the invention by being inserted into the inside of second horizontal member 520 on the installation of second horizontal member 520.

Outer size in the width direction of projection portion 502 is set approximately as it can be closely inserted corresponding to the inner size in the width direction of second horizontal member 520, and inner size of the up-and-down direction is set approximately as it can be loosely inserted corresponding to the inner size of the up-and-down direction of second horizontal member 520.

On the other hand, threaded screw hole-like first fixing portion 503 is installed in the position beveled obliquely downward toward the reverse projection direction from projection end face of projection 502, upper board 520a Is caved like < shape in the side view in the predetermined position of upper board 520a of second horizontal member 520 and second fixing portion having screw penetrating hole 522 in caved slope 521 is installed.

When connection portion 500 and second horizontal member 520 contact to each other, the face of intervening portion 501 is corresponding to contact face 501a of the invention and the end face of second horizontal member 520 is corresponding to contact face 520t of the invention.

When they are drawn to the direction where they are close to each other using bolt-like drawing means 6B, not only a force pressing contact face 501a to contact face 520t works, but also sliding force allows contact face 520t to slide downward along contact face 501a is generated. Sliding action more than constant is controlled by which upper board 520a of horizontal member 520 contacts projection portion 502 with the sliding force and accordingly projection portion 502 works as a position determining means. Accordingly first horizontal member 510 and second horizontal member 520 are connected to the predetermined position through connection member 500.

Accordingly even if inside space of first horizontal member 510 is narrow, second horizontal member 520 can be connected. Further the screw hole can be set as longer and therefore first fixing portion 503 is set in projection 502 because the projection portion can be set as thick. Accordingly the drawing force of drawing means 6B based on screwing screw can be more secured. The position connecting second horizontal member 520 can be easily set because processing on first horizontal member 510 is only to make a screw hole. A connection angle between first horizontal member 510 and second horizontal member 520 can be adequately set by adequately adjusting the form of intervening portion 501 because it is connected to first horizontal member 510 and second horizontal member 520 through connection member 500.

Figure 17:
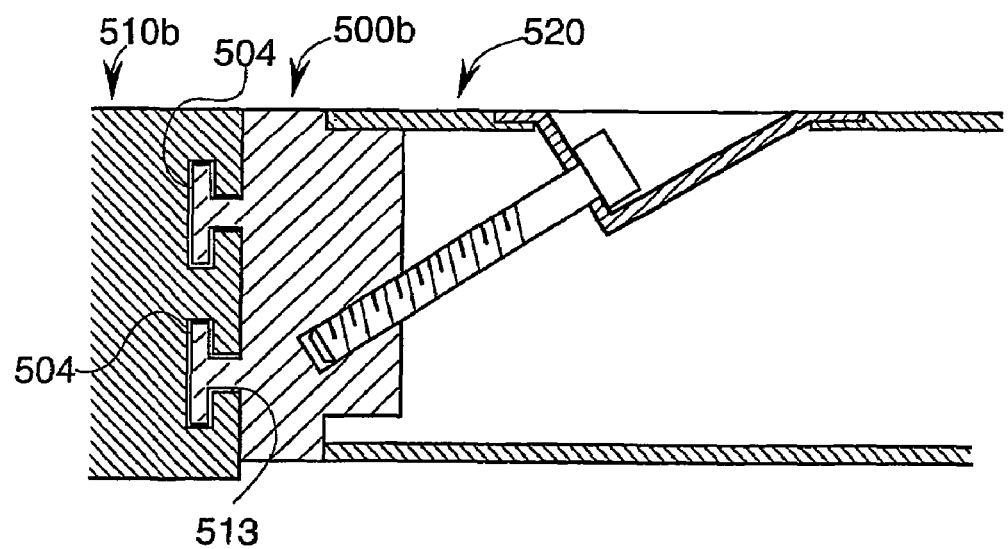
FIG. 17 is a cross section view of a staple portion according to an implementation of the other alternated embodiment of the invention.

Further referring to FIG. 17, the device which can fix connection member 500b to first horizontal member 510b is disclosed. Connection member 500b comprises engaging face 504 which can be engaged to rail groove 513 in first horizontal member 510b comprising rail groove 513 extending in longitudinal direction in the side face connecting second horizontal member 520, in which first horizontal member 510b and connection member 500b are fixed by engagement of engaging face 504 with rail groove 513. Accordingly not only first horizontal member 510b and connection member 500b can be securely connected, but also second horizontal member 520 can be connected to a desired position along rail groove 513.

Figure 18:
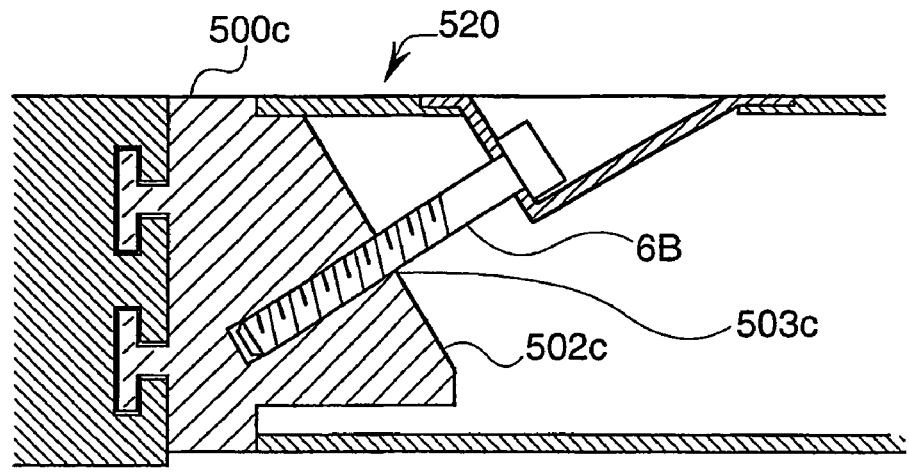
FIG. 18 is a cross section view of a staple portion according to an implementation of the other alternated embodiment of the invention.

Further referring to FIG. 18 illustrating connection member 500c, the device comprising beveled projection end face 502 is illustrated in which drawing direction of drawing means 6B coincides with the direction which first fixing portion 503c installed in connection member 500c is facing to. Accordingly second horizontal member 520 can be farther securely connected because screw hole can be set as farther longer.

Figure 19:
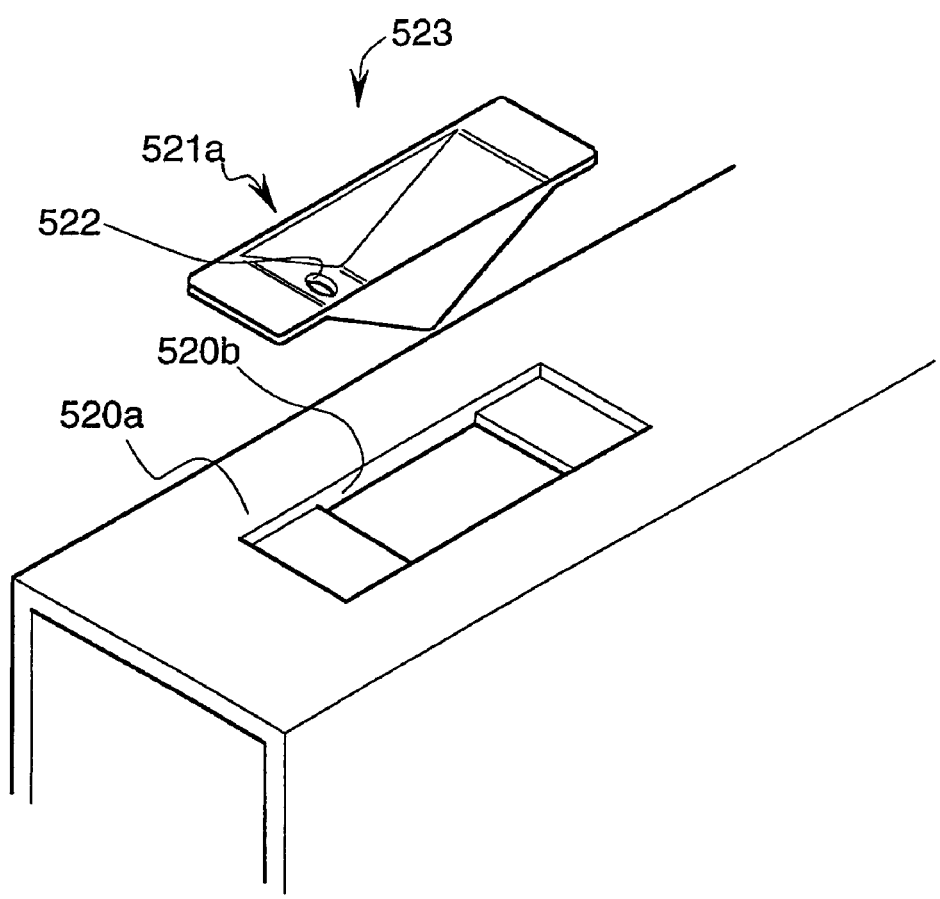
FIG. 19 is a perspective view of a staple portion according to an implementation of the other alternated embodiment of the invention.
Figure 20:
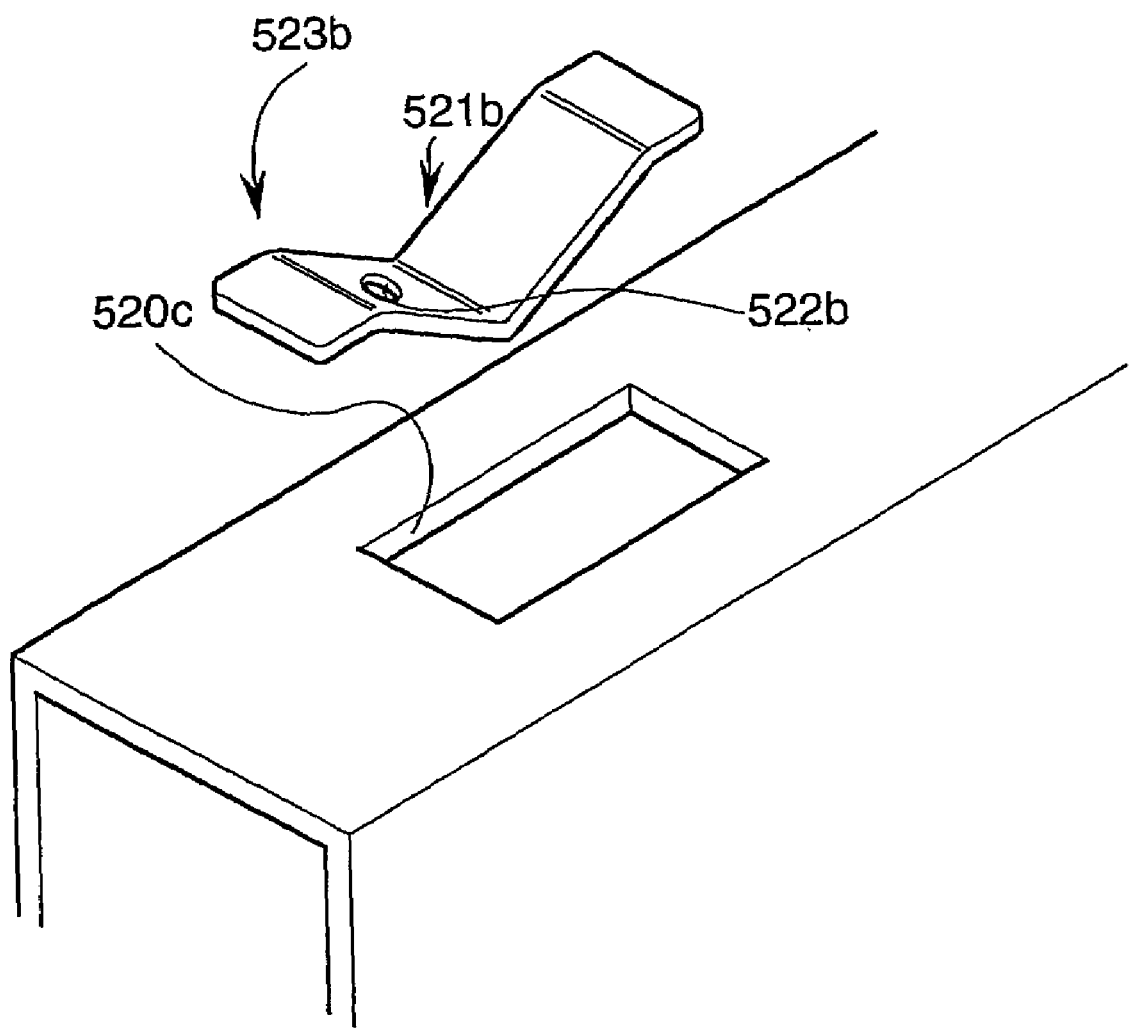
FIG. 20 is a perspective view of a staple portion according to an implementation of the other alternated embodiment of the invention.

Further FIG. 19 is a perspective view of a device comprising second fixing portion 523 installed in second horizontal member 520 illustrated in FIG. 16 to FIG. 18. The device is composed of opening portion 520b which is installed in upper board 520a of second horizontal member 520 and second fixing portion 523 which is formed by inserting fixing member 521a having penetrating screw hole 522. Accordingly a process performed to second horizontal member 520 is only to install opening portion 520b and therefore second horizontal member 520 can be easily connected to connection member 500. Further referring to FIG. 20 the device comprises simple rectangular opening portion 520c installed in second horizontal member 520, fixing member 521b which was formed by bending the rectangular plate member having penetrating screw hole 522b is inserted to opening portion 520c to install second fixing member 523b. Accordingly a process performed to second horizontal member is only to open opening portion 520c and fixing member 521b can be formed by only bending a plate member, and therefore second fixing 523b can be easily installed.

Figure 21:
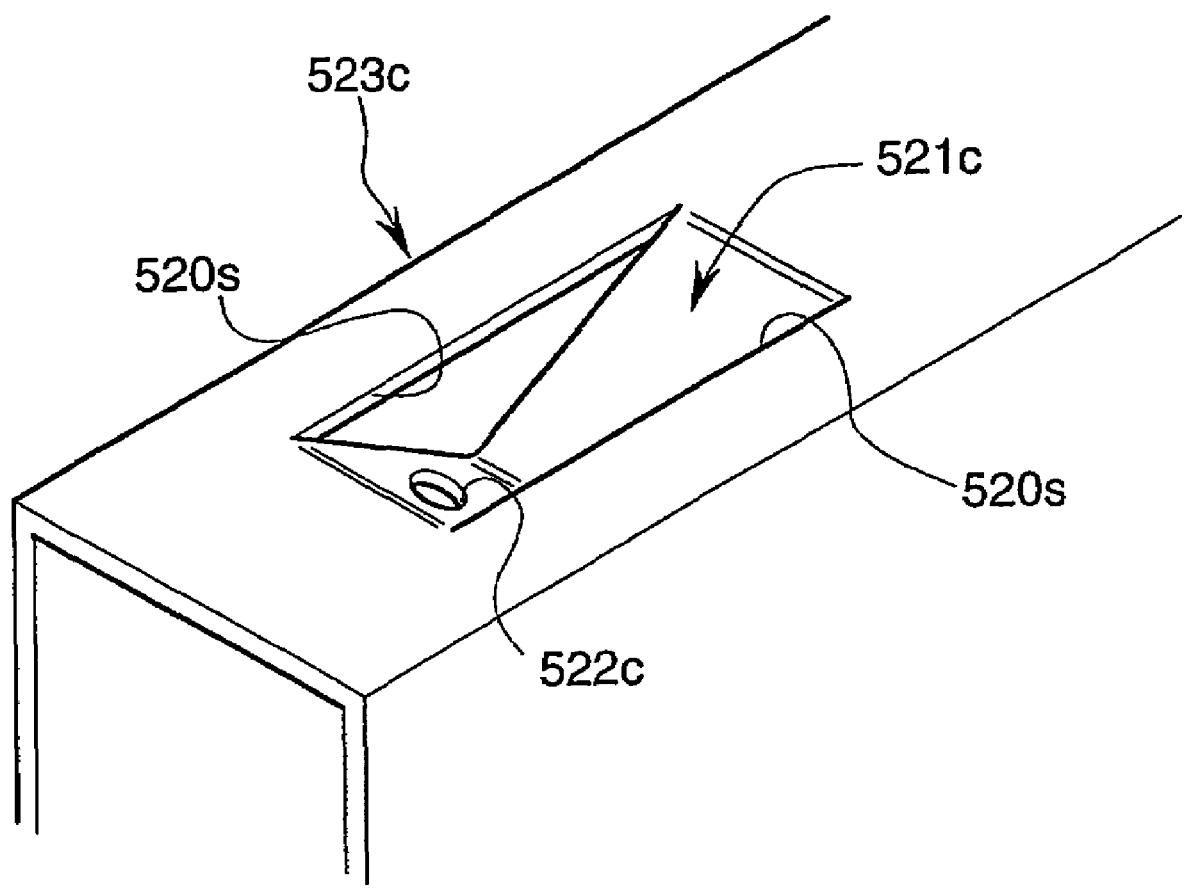
FIG. 21 is a perspective view of a staple portion according to an implementation of the other alternated embodiment of the invention.

Further referring to FIG. 21, second fixing portion 523c is formed by forming two cuts which are in parallel each other in the longitudinal direction in the predetermined position of second horizontal member 520 and penetrating screw hole 522c in <-shape cave 521c in side view which was produced by a press work. Accordingly connection can be carried out on such as connection member 500 without using a separate member to second horizontal member 520.

Figure 22:
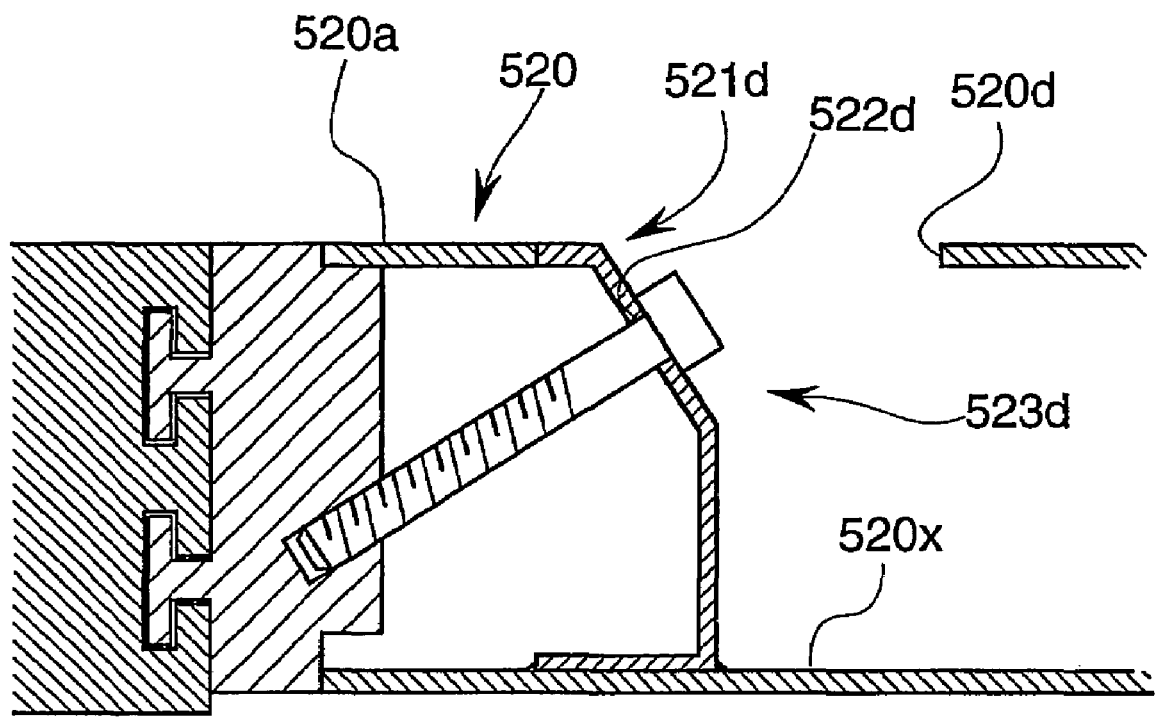
FIG. 22 is a cross section view of a staple portion according to an implementation of the other alternated embodiment of the invention.

Further referring to FIG. 22, a device is composed of second fixing member 523d formed by welding fixing member 521d having penetrating screw hole 522d, which is inserted to downward inside of second horizontal member 520 from opening portion 520d formed in second horizontal member 520, to under plate 520x of second horizontal member 520. Accordingly fixing member 521d contacts upper board 520a of second horizontal member 520 at upper portion and lower board 520x of second horizontal member 520 at lower portion. Accordingly the drawing force to second horizontal member 520 can be worked effectively to connect to such as connection member 500 because the drawing force of drawing means 6B to second horizontal member 520 can be separately transferred to upper board 520a and lower board 520x of second horizontal member 520.

Other composition can be implemented with various alternations within the scope of the invention.

INDUSTRIAL APPLICABILITY

According to the detail description of the invention, when the first member and the second member are drawn by a drawing means, the force acts along the direction of board face of opposing walls through the first bridge member and the second bridge member. Accordingly even if the first member and the second member are relatively thin materials, the members can be sufficiently pressed and fixed to each other without caving in the thickness direction by the drawing force due to the drawing means in comparison with traditional connection means.

Further according to the invention, when the first member and the second member are drawn, a divisional force which slides the first member and the second member along the contact face is generated by the force, and the first member and the second member are coherent in closing direction with the slide divisional force, and a position determination of sliding direction along contact face of the first member and the second member can be carried out. Specifically the drawing force by the drawing means as is works to determine the position and position determination to two directions can be effectively and efficiently carried out by one operation.

The invention claimed is:

1. A member-joining device connecting a first member having a pair of opposing walls and a second member having a pair of opposing walls comprising, a first bridge member for spanning between the opposing walls of said first member at a predetermined position of said first member;

a second bridge member for spanning between the opposing walls of said second member at a predetermined position of said second member;

a drawing means for drawing the first bridge member and the second bridge member in the direction where both are close to each other;

wherein said first member and said second member are pressed and connected by a drawing force based on said drawing means, said drawing means draws and tightens said first bridge member and said second bridge member by utilizing screw forwarding mechanisms;

wherein the second member adjacent to one end of the first member is connected through the first member; the first member including a pair of slightly beveled contact faces in a downwardly drawing direction;

said second member including at least one end face pressed to the contact face of the first member to join the first and the second members;

wherein said second member is a pipe member;

said first member comprising:

a tubular outer member having a cross sectional shape coinciding with said second member; and an inner member projecting outward from each contact face of the outer member and the projection portion of said inner member is inserted into the end portion of the second member to connect the first member and the second member together; and wherein a line connecting between said first bridge member and said second bridge member is not in right angles to said contact face from a side view; a dividing force is generated by the drawing force to slide a contact face and an end face; an outer peripheral face of said inner member and an inner peripheral face of said second member contact closely with the sliding force; and a position of said first member and said second member is determined.

2. The member-joining device according to claim 1, wherein the first member and the second member engage in a direction which substantially coincides with a horizontal direction; and the line from the first bridge member provided towards one end of the first member to the second bridge member provided on the second member adjacent to one end of the first member and another line from another first bridge member provided towards the other end of the first member to another second bridge member provided on another second member adjacent to the opposite end of the first member have a shape of the sides of a trapezoid from a side view.

3. The member-joining device according to claim 2, wherein the lines having a shape of the sides of a trapezoid from the side view are in a lower half region of the vertical direction of the first member and the second member.

* * * * *